Patented May 30, 1939

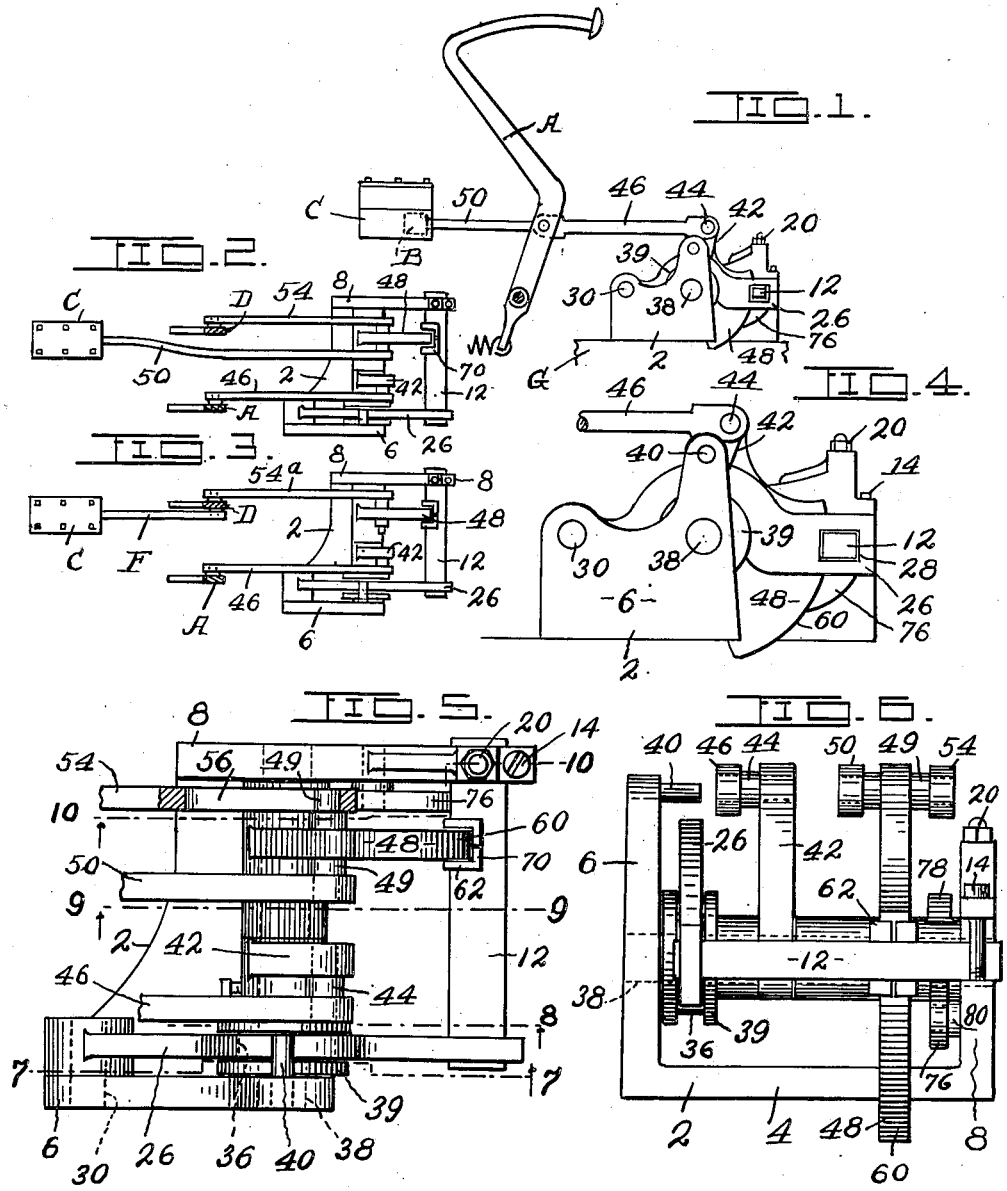

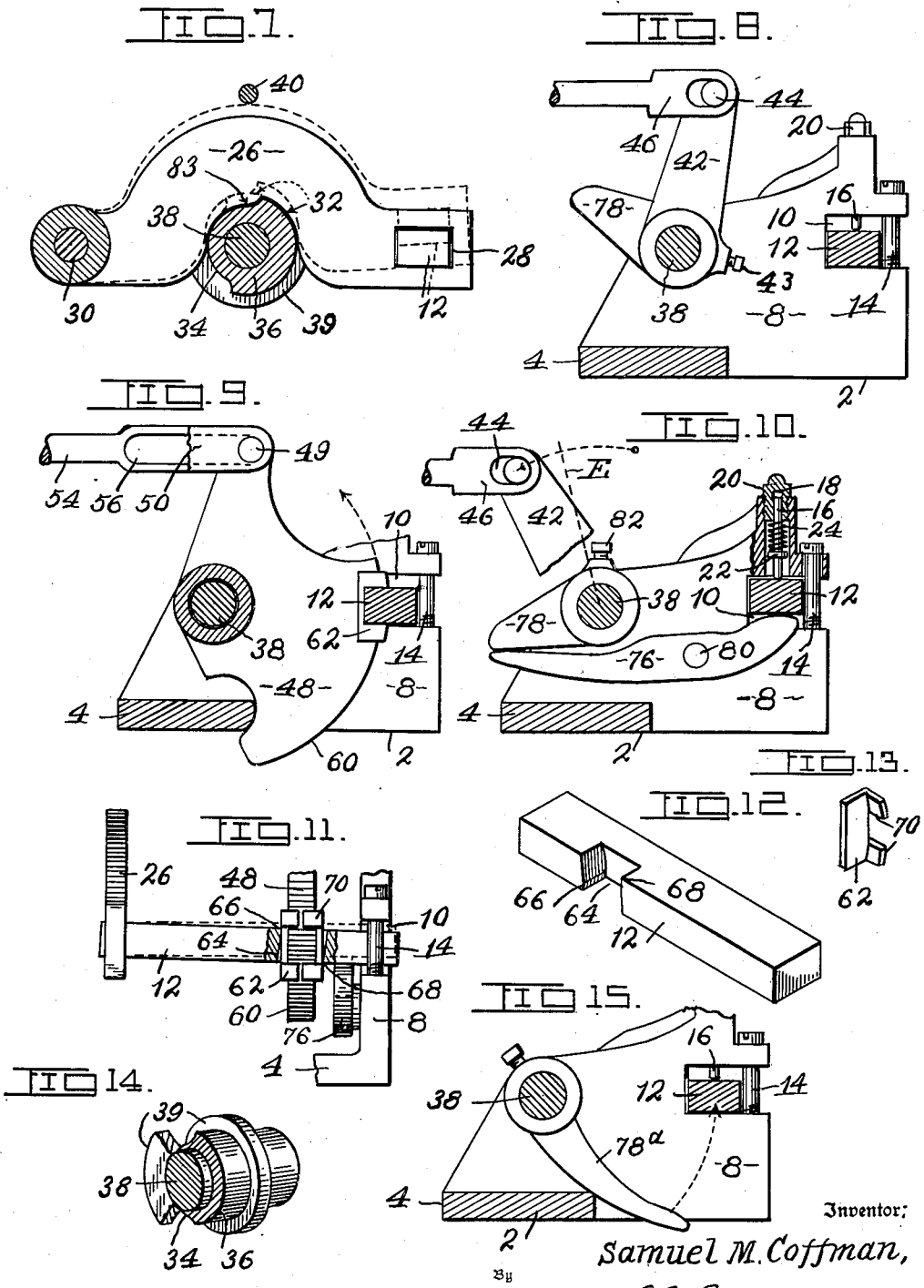

2,160,126

UNITED STATES PATENT OFFICE 2,160,126

BRAKE HOLDING AND RELEASING MEANS

Samuel M. Coffman, Kansas City, Mo.

Application January 28, 1938, Serial No. 187,427

12 Claims. (Cl. 192—13)

My invention relates to a brake holding and releasing device and one object is to provide a safety device of this character which will prevent a motor vehicle, when stopped on an incline, from starting to drift downward while the clutch is disengaged and the foot is removed from the brake pedal.

A further object is to provide a device of this character whereby the brakes of the vehicle may be instantly released to permit the driver to back down grade and thereby avoid collision with some other car that is drifting down the grade.

Another object is to provide a device of this character which can be applied either to standard hydraulic brakes, or mechanical brakes at a small cost, and which is simple in construction and reliable in operation.

Other objects will hereinafter appear and in order that the invention may be fully understood reference will now be had to the accompanying drawings, in which:—

Fig. 1 is a side elevation of the device associated with a portion of a hydraulic brake system.

Fig. 2 is a plan view of the parts shown by Fig. 1.

Fig. 3 is a plan view somewhat similar to Fig. 2.

Fig. 4 is a side elevation of the device.

Fig. 5 is a plan view of the device.

Fig. 6 is a front elevation of the device.

Figs. 7 to 10, inclusive, are detail cross sections on lines 7—7, 8—8, 9—9, and 10—10, respectively, of Fig. 5, with some of the parts removed to avoid needless repetition.

Fig. 11 is a fragmentary view of some of the parts.

Fig. 12 is a detail perspective view of a locking member.

Fig. 13 is a detail of a cam partly broken away.

Fig. 14 is a detail of one of a pair of shoes.

Fig. 15 is a fragmentary side elevation, partly in section, of a modified form.

In carrying out the invention I provide a frame 2 which is substantially U-shaped and comprises a base member 4 and side members 6 and 8, respectively. The side member 8 is provided with an aperture 10 for the reception of one end of a locking member 12 held in the aperture 10 by a pin or screw 14.

The end of the locking member 12 is normally held upon the bottom of the aperture 10 by means of a presser member comprising a pin 16, the upper portion of which is slidably mounted in a tubular member 20 threaded in a bore 18 in the side member 8. The pin 16 is pressed downward upon the locking member 12 with an expansion spring 24 interposed between the member 20 and a collar 22 fixed to the pin 16.

The opposite end of the locking member 12 extends through an aperture 28 in one end of a lever 26 mounted at its opposite end upon a stub shaft 30 projecting from the side member 6 of the frame 2. The intermediate portion of the lever 26 is recessed as shown by Fig. 7 to fit upon the major and minor radii 32 and 34, respectively, of a cam 36 fixed upon a rock shaft 38 mounted in the side members 6 and 8.

The cam 36 is adapted to raise and lower the lever 26 and thereby move the locking member 12 to active and idle positions, respectively. Peripheral flanges 39 are spaced apart upon the cam 36 to admit the recessed portion of the lever 26 and prevent lateral movement of the latter. A stop 40 projects over the lever 26 from the side member 6 of the frame 2 to prevent said lever from being jolted out of place upon the cam 36 when the vehicle is traveling over rough ground.

An arm 42, arranged beside the lever 26, is fixed at one end upon the rock shaft 38 with a set screw 43 and has a pin-and-slot connection 44 with one end of a rod 46 which is pivotally connected at its opposite end to the clutch pedal A. The pin-and-slot connection 44 permits slight independent movement between the clutch pedal A and the arm 42.

A rockable member 48, arranged beside the arm 42, is freely mounted upon the rock shaft 38 and connected by a pivot 49 to a rod 50 which may be connected to any standard mechanical brake system, or, as shown by Fig. 1 to the plunger B operating in the master cylinder C of a conventional hydraulic brake system.

A rod 54 is connected at one end to the pivot 49 and at its opposite end to the conventional brake lever D, so that when the same is advanced to apply the brakes it will rock the member 48 forward to hold the brakes in applied position and thus allow the driver to remove his foot from the brake pedal and apply it to either the starter, or the accelerator of the motor vehicle. Preferably, the rod 54 is provided with a longitudinal slot 56, so that after the brakes have been applied the brake pedal D and the rod 50 may move backward to idle position without moving the member 49 backward therewith.

As shown by Fig. 9, the rockable member 48 has a curved face 60 which is concentric with the rock shaft 38. The face 60 and adjacent side portions of the member 48 extend between a pair of shoes 62 mounted in a slot 64 formed in the locking member 12. The opposite sides of the slot 64 are slightly inclined from the vertical as shown by Figs. 11 and 12, to present two diagonally opposed abutments 66 and 68 to the respective shoes 62, which are held in place with integral lugs 70 that engage the top and bottom, respectively, of the locking member 12. By arranging the slot 64 as shown it will permit the rockable member 48 to move forward but not backward when the locking member 12 is in active position. From the foregoing it will be understood that when the clutch is disengaged and the brakes are applied the latter will be held in active position until the clutch is again engaged, with the result that if the driver had to back down grade to avoid collision with another car the gear shift lever would have to be thrown in reverse and the clutch engaged before the vehicle could be backed.

To avoid the delay incident to the foregoing operations I have provided means whereby the brakes may be instantly released by the simple act of advancing the clutch pedal a short distance beyond what is necessary to disengage the clutch. Such means includes compound leverage means for moving the locking member 12 to idle position, comprising levers 76 and 78, the former of which is mounted upon a stub shaft 80 and bears at one end against the under side of the locking member 12 near the end thereof which extends through the aperture 18. The lever 78 controls the lever 76 and in turn is actuated by the rock shaft 38 upon which it is secured by a set screw 82.

In practice the frame 2 is secured to any suitable part of the vehicle as the device will operate equally as well when located either in front or in back of the clutch and brake pedals A and D, respectively.

In operation, when the vehicle is ascending or descending a grade it may be stopped in the usual manner by advancing the clutch and brake pedals A and D, respectively. As the clutch pedal A is advanced it swings the arm 42 forward to approximately the position shown by the dotted line E, Fig. 10, through the intermediary of the rod 46, and thus rocks the shaft 38 which in turn rotates the cam 36 until the high radius 32 passes under a shoulder 83 of the lever 26 and thereby lifts the same from the full line to the dotted line position shown by Fig. 7.

Upward movement of the lever 26 raises the associated end of the locking member 12 to the position shown in full lines on Fig. 11, and thereby forces the abutments 66 and 68 against the respective shoes 62 with sufficient pressure to cause them to grip the sides of the rocking member 48 so firmly as to hold the same in active position. The driver may now remove his foot from the brake pedal D as the brakes will be held in active position by the rockable member 48 and the connecting rod 50 so long as the clutch lever A is held in advanced position. When the driver removes his foot from the brake pedal, as stated, the same may return to inactive position due to the slot 56 which allows the rod 54 to move backward while the rockable member 48 remains in active position.

When the driver is ready to move forward he permits the pedal A to move backward to engage the clutch and through the intermediary of rod 46, arm 42, rock-shaft 38 and the cam 36, lowers the lever 26 and the locking member 12 to the full line position shown by Figs. 6 and 7. Lowering of the locking member 12 relieves the pressure on the shoes 62 and the rockable member 48, which latter then releases the brakes.

When it becomes necessary to back down grade to avoid collision with another car the brakes may be instantly released by advancing the clutch pedal until the arm 42 is moved from the dotted line position E to the full line position, Fig. 10. This causes the lever 78 to operate the lever 76 which in turn lifts the associated end of the clamping member 12 to the positions shown in full lines by Fig. 10 and in dotted lines on Fig. 11, and thereby releases the rockable member 48 until the brakes are again applied.

In the form shown by Fig. 3 the rod 50, connecting the plunger B to the rockable member 48, is dispensed with as the plunger B is connected to the brake pedal D in the conventional manner with the plunger rod F. This arrangement will hold the brake pedal D in advanced position as long as the brakes are applied instead of letting it move to idle position as when the rod 50 is employed. The foregoing change however permits the device to be installed on cars now in use in less time, as the conventional connection between the plunger B and the pedal D need not be disturbed. The slot 56 is also dispensed with.

In the modified form shown by Fig. 15, the lever 76 is dispensed with and a lever 78a adapted to lift the adjacent end of the locking member 12, is substituted for the lever 78. This form will save the expense of providing the levers 76 and pivot 80, but will require a little more pressure to disengage the clutch.

From the foregoing it will be understood that I have provided a device which is well adapted for the purpose intended, and while I have shown several forms I reserve the right to such other forms and modifications as properly fall within the spirit and scope of the invention as claimed.

Having thus described my invention, what I claim and desire to secure by Letters Patent, is:—

1. In combination with the brake pedal and the clutch pedal of a motor vehicle, a suitably supported rockable member connected to the brake pedal so that they may be advanced and retracted together, locking means for securing said rockable member in advanced position, a lever for controlling said locking means, cam means for controlling said lever, and means controlled by the clutch pedal for moving said cam means to active position when the clutch pedal is advanced and for moving said cam means to idle position when the clutch pedal is retracted.

2. In combination with the brake pedal and the clutch pedal of a motor vehicle, a rockable member connected to the brake pedal so that they may be advanced and retracted together, locking means for securing said rockable member in advanced position when the brake and clutch pedals are advanced, a lever for controlling said locking means, cam means for controlling said lever, a suitably mounted rock shaft upon which the rockable member is freely mounted and upon which the cam means is fixed, and means controlled by the clutch pedal for moving said rock shaft to active position when the clutch pedal is advanced and for moving said rock shaft to idle position when the clutch pedal is retracted.

3. In combination with the brake pedal and the clutch pedal of a motor vehicle, a rockable member connected to the brake pedal so that they may be advanced and retracted together, locking means for securing said rockable member in advanced position when the brake and clutch pedals are advanced, a lever for controlling said locking means, cam means for controlling said lever, a suitably mounted rock shaft upon which the rockable member is freely mounted and upon which the cam means is fixed, an arm fixed to said rock shaft to control the same, and means connecting the arm to the clutch pedal so that the latter may control said arm.

4. In combination with the brake and clutch mechanisms of a motor vehicle, a rockable member connected to the brake mechanism and adapted to hold the same in applied position when the brake and clutch pedals are in advanced position, locking means having diagonally opposed abutments adapted to engage and hold the rockable member in active position when said locking means is moved to active position, and means controlled by the clutch mechanism for moving said locking means to active position when the clutch is disengaged and for moving the locking means to idle position when the clutch is engaged.

5. In combination with the brake and clutch mechanisms of a motor vehicle, a rockable member having a segmental face and connected to the brake mechanism and adapted to hold the same in applied position when the brake and clutch pedals are advanced, a locking member having a slot into which the face of said rockable member freely projects, diagonally opposed abutments on said locking member adjacent to the slot and adapted to engage opposite sides of said rockable member and hold it in active position when the locking member is moved to active position, and means actuated by the clutch mechanism for controlling said locking member.

6. In combination with the brake and clutch pedals of a motor vehicle, a rockable member actuated by the brake pedal and adapted to hold the same in advanced position after the brakes have been applied and the clutch has been disengaged, a locking member having abutments adapted to engage and hold said rockable member in active position, a lever for moving said locking member to active position when the clutch pedal is advanced, a lever for moving said locking member to inactive position to release the rockable member when the clutch pedal is further advanced, and means controlled by the clutch pedal for actuating said levers.

7. In combination with the clutch and brake pedals of a motor vehicle, a rockable member having an arcuate face and adapted to be actuated by the brake pedal to hold the same in advanced position after the brakes have been applied, a locking member having a slot into which the curved face of said rockable member extends, diagonally opposed shoulders adjacent to said slot adapted to engage opposite sides of said rockable member and secure the same in active position, means controlled by the clutch pedal for moving said locking member to active position when the clutch pedal is advanced, and compound leverage means controlled by the first-mentioned means and adapted to move the locking means to inactive position to effect release of the rockable member when the clutch pedal is further advanced.

8. In combination with the brake and clutch pedals of a motor vehicle, a rockable member actuated by the brake pedal and adapted to hold the same in advanced position after the brakes have been applied, a locking member having abutments adapted to engage and hold said rockable member in active position, a lever adapted to lift one end of said locking member and thereby move the latter to active position when the clutch pedal is advanced, spring-pressed means yieldably holding the other end of the lever in a depressed position, a lever adapted to lift said other end of the locking member to move the latter to inactive position and thereby effect release of the rockable member when the clutch pedal is further advanced, and means controlled by the clutch pedal for actuating said levers.

9. In combination with the brake mechanism and the clutch pedal of a motor vehicle, a rockable member connected to the brake mechanism and adapted, when in active position, to hold the brake mechanism in applied position, a rod connecting the brake pedal and said rockable member to move the latter to active position when the brake pedal is advanced, said rod having a slot to permit the brake pedal to move backward independently of the rockable member, a locking member adapted to engage opposite sides of said rockable member to hold the same in active position when the brake and clutch pedals are advanced, and means controlled by the clutch pedal for actuating said rockable member.

10. In combination with the hydraulic brake mechanism and the clutch pedal of a motor vehicle, a rockable member connected to the master plunger of the brake mechanism and adapted, when in active position, to hold the same in applied position, a rod connecting the brake pedal and said rockable member to move the latter to active position when the brake pedal is advanced, said rod having a slot to permit the brake pedal to move backward independently of the rockable member, a locking member having diagonally opposed abutments adapted to engage opposite sides of said rockable member to hold the same in active position when the brake and clutch pedals are advanced, and means controlled by the clutch pedal for holding the rockable member in active position when the clutch pedal is advanced and for releasing said rockable member when the clutch pedal is retracted.

11. A device of the character described comprising a frame adapted to be secured to a motor vehicle, a rock shaft mounted in said frame, an arm fixed to said rock shaft to control the same, means for connecting the arm to the clutch mechanism of the motor vehicle so that said arm may be controlled by said clutch mechanism, a rockable member freely mounted upon the rock shaft and adapted, when in active position, to hold the brake mechanism of the motor vehicle in applied position when the brake pedal is advanced, a rod for connecting said rockable member to the brake mechanism and whereby said rockable member is moved to active position when the brakes are applied, and means controlled by the rock shaft for holding said rockable member in active position when the clutch is disengaged and for releasing said rockable member when the clutch is engaged.

12. A device of the character described comprising a frame adapted to be secured to a motor vehicle having brake and clutch mechanism, a rockable member associated with said frame and connected to the brake mechanism to hold the same in applied position after the brake and clutch pedals have been advanced, a pair of shoes disposed at opposite sides of said rockable member, a locking member associated with the frame and adapted to force said shoes into engagement with the rockable member with sufficient pressure to hold the same in active position, and mechanism controlled by the clutch mechanism for moving said locking member to active position when the clutch is disengaged and to inactive position when the clutch is engaged.

SAMUEL M. COFFMAN.